(12) United States Patent
Hazan et al.

(10) Patent No.: US 7,740,911 B2
(45) Date of Patent: Jun. 22, 2010

(54) METHOD OF FORMING A MULTI-LAYER COATING ON AUTOMOBILE BODIES WITHOUT A PRIMER BAKE

(75) Inventors: Isidor Hazan, Miami Beach, FL (US); Jeffery W. Johnson, Rochester, MI (US); Robert R. Matheson, West Bloomfield, MI (US); Delson J. Trindade, Rochester Hills, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 930 days.

(21) Appl. No.: 11/543,621

(22) Filed: Oct. 5, 2006

(65) Prior Publication Data

US 2007/0082211 A1   Apr. 12, 2007

Related U.S. Application Data

(60) Provisional application No. 60/724,511, filed on Oct. 7, 2005.

(51) Int. Cl.
*C09D 3/02* (2006.01)
(52) U.S. Cl. ................. 427/385.5; 427/372.2; 427/402
(58) Field of Classification Search ................. 428/500; 427/372.2, 375, 384, 385.5, 402; 524/556
See application file for complete search history.

(56) References Cited

U.S. PATENT DOCUMENTS 4,546,046 A * 10/1985 Etzell et al. .................. 428/460

(Continued)

FOREIGN PATENT DOCUMENTS

EP   0 594 142 B1   8/1998

(Continued)

OTHER PUBLICATIONS

Peck et al., "Branching and Scisson Reactions in High Temperature Acrylate Polymerizations", Polymer Preprints (2002), 43(2), pp. 154-155.

(Continued)

*Primary Examiner*—Thao T. Tran
(74) *Attorney, Agent, or Firm*—Brian J Myers

(57) ABSTRACT

This invention relates to a method for forming a multi-layer coating, comprising sequentially applying a layer of primer coating composition, a layer of base coat composition, and a layer of clear coat composition on an automotive substrate in a wet-on-wet-on-wet manner, and simultaneously curing the applied three layers together in a single baking step. The primer surfacer comprises a film forming binder, a volatile organic liquid carrier, and pigment(s); and the binder contains about (a) 40 to 95% by weight of a caprolactone-modified highly branched acrylic polymer having a hydroxyl and/or carboxyl monomer content, all or part of which has been reacted with caprolactone, of about 1 to 65% by weight and a weight average molecular weight of about 10,000 to 150,000; and (b) 5 to 60% by weight of an aminoplast resin crosslinking agent. The composition is essentially free of crosslinked nonaqueous dispersion resin particles or crosslinked microgel resin particles or both. The resulting cured multi-layered coating has excellent aesthetic appearance, strike-in resistance, chipping resistance, sag resistance, and film build even when formed in a three wet layered application method.

4 Claims, 4 Drawing Sheets

U.S. PATENT DOCUMENTS

| | | | |
|---|---|---|---|
| 4,591,533 A | | 5/1986 | Antonelli et al. |
| 4,720,528 A | | 1/1988 | Etzell et al. |
| 5,162,426 A | | 11/1992 | Hazan et al. |
| 5,179,183 A | * | 1/1993 | Koleske et al. ............... 526/301 |
| 5,314,945 A | * | 5/1994 | Nickle et al. ................. 524/507 |
| 6,737,477 B1 | * | 5/2004 | Figge .......................... 525/131 |
| 6,863,929 B2 | | 3/2005 | Watanabe et al. |
| 2005/0176880 A1 | | 8/2005 | Fujii et al. |

FOREIGN PATENT DOCUMENTS

| | | |
|---|---|---|
| EP | 0 719 795 B1 | 8/1998 |
| WO | WO 03/070844 A1 | 8/2003 |

OTHER PUBLICATIONS

PCT International Search Report and Written Opinion for International Application No. PCT/US2006/039659 dated Jan. 24, 2007.

* cited by examiner

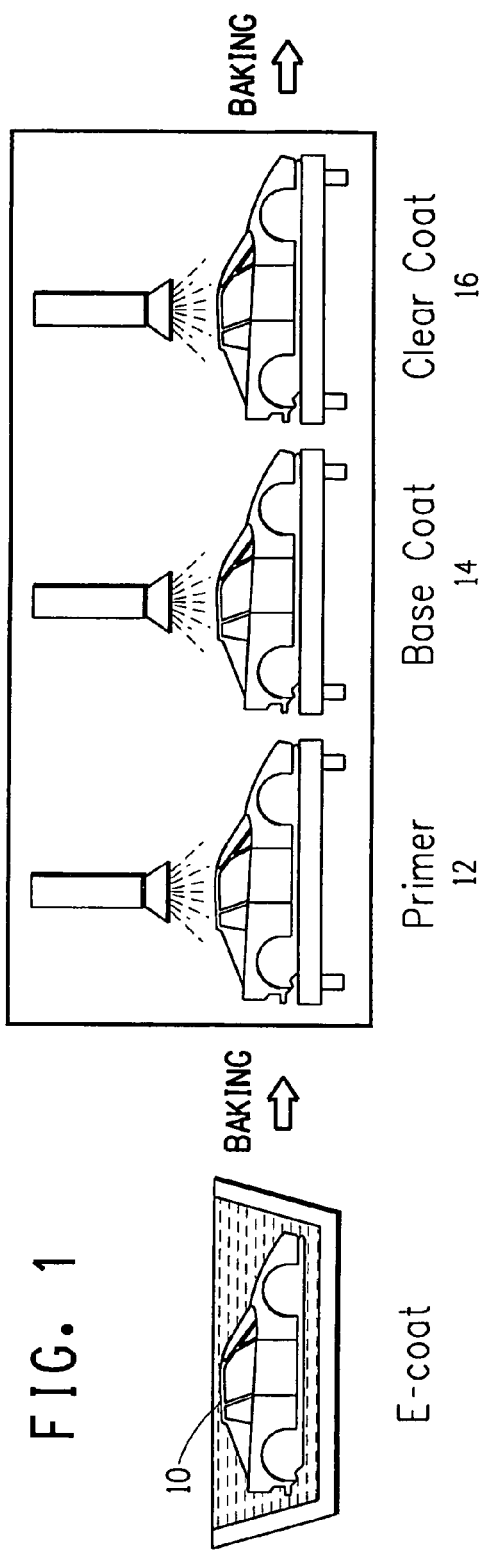
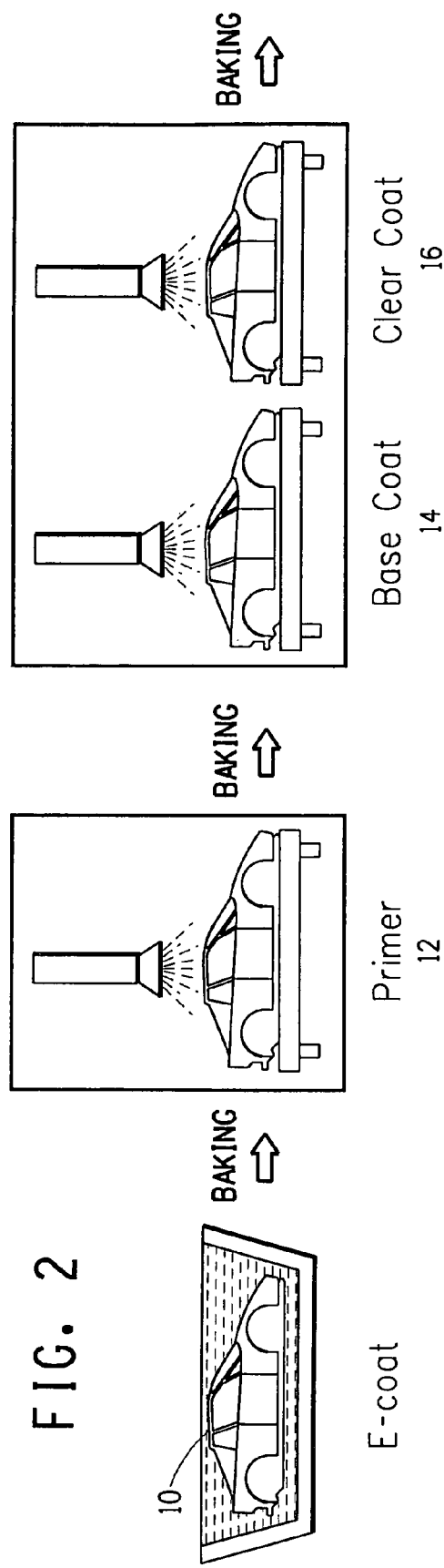
FIG. 1
FIG. 2

METHOD OF FORMING A MULTI-LAYER COATING ON AUTOMOBILE BODIES WITHOUT A PRIMER BAKE

CROSS-REFERENCE TO RELATED APPLICATION

This application claims priority under 35 U.S.C. §119 from U.S. Provisional Application Ser. No. 60/724,511, filed Oct. 7, 2005.

FIELD OF THE INVENTION

The invention concerns a method of forming a multi-layer coating on an automotive body or part thereof and in particular to a method of forming multi-layer coating with which a good finished appearance can be obtained by baking the primer, basecoat, and clearcoat layers at the same time, and also to a primer composition which has excellent resistance to interfacial bleeding with the top coated film and can be used in the forgoing method.

BACKGROUND OF THE INVENTION

Coating systems for automobiles normally comprise a multiplicity of coatings applied to a steel substrate. Typically, the steel is treated with a rust-proofing phosphate layer, then a cathodic electrocoat primer for additional corrosion protection is applied. A primer-surfacer (also known as a chip resistant primer, primer, or primer filler) is used next to smooth the surface for topcoating and also to provide stone chip resistance to the coating system during the normal course of driving. Then a top-coat system is applied, sometimes as a single colored coat, more often now as a basecoat with solid color or flake pigments followed by a transparent protective clear coat, to protect and preserve the attractive aesthetic qualities of the finish on the vehicle even on prolonged exposure to the environment or weathering.

Coating film formation of the basecoat and the clearcoat is normally achieved by wet-on-wet application, which is to say that the clearcoat is applied to the basecoat without baking the basecoat prior to clearcoat application (although the basecoat may be flash dried for a short period of time at room temperature prior to clearcoat application), and then subsequently baking the basecoat and clearcoat at the same time to form a dried and cured finish. In the conventional method for forming the multi-layer coating film, the underlying primer surfacer layer, however, is baked before being topcoated with basecoat and clearcoat. Historically, baked primers have been used not only to provide a smooth surface on which to apply the topcoat, but also to also prevent interfacial bleeding or intermixing with the overlying basecoat and avoid disrupting the appearance of the overall topcoat finish. Resistance to intermixing (sometimes referred to as "strike-in" resistance) is especially important for the appearance of glamour metallic finishes which are popular nowadays on automobiles and trucks. Any disturbance of the metallic pigment flake orientation in metallic basecoats after application over the primer-surfacer will detract from the metallic effect of the finish. Therefore, care must be taken to ensure that the metal pigment flakes are not disturbed after painting.

In recent years, it has also been strongly desired to reduce the environmental load or impact of automotive assembly plants by reducing VOC (volatile organic compounds) emissions and $CO_2$ (carbon dioxide) emissions generated from operating painting booths and baking ovens. This has led to use of lower solvent content in the paint and the development of three-layer wet paint systems which make it possible to apply a primer surfacer, basecoat and clearcoat wet-on-wet continuously before they are cured all at once in a single bake. With this simplified application process, it is possible to eliminate the separate primer painting booth and primer oven, which also results in substantial cost savings to the automobile manufacturers. The technical hurdles of this process simplification, however, have been significant. For instance, interfacial bleeding and aesthetic appearance, as well as film properties such as chip resistance are still significant concerns.

Attempts have been made to address the forgoing problems by modifying the formulation of the primer coating material. U.S. Pat. No. 6,863,929 of Watanabe et al. describes a method for forming a multilayer automotive coating film using a three layer wet paint process (also referred to as a "3 wet" or a "3-coat-1-bake" process) wherein a standard polyester-melamine primer coating is formulated to also contain acrylic polymer particles, namely in the form of internally crosslinked nonaqueous dispersion (NAD) polymers or internally crosslinked microgel particles. These particles are intended to raise the viscosity and solubility parameter between the primer surfacer and the base coating to prevent intermixing at the interface between the coated layers. However, use of such particle-filled systems also suffers from some drawbacks.

For example, the microparticles also tend to create voids in the surface of the wet primer where the basecoat can still flow in and intermix, resulting in defects in the aesthetic appearance such as loss of smoothness, gloss, head on brightness, and/or metallic effect. Sagging of these coatings, especially on vertical panels, such as doors, fenders, rocker panels, etc, is also a problem. These particle-filled systems are also not able to maintain dry film builds at normal commercial levels. Film builds must therefore be reduced to allow the NAD or microgel particle to migrate to the interface. Yet, thin films are an impediment as they tend to subject the underlying corrosion-protective electrocoated primer layer to excessive UV light transmission and deterioration. Thin films or thin film regions are also inadequate for mechanical properties and visual appearance of the overall finish.

Therefore, there is still a need to find a more effective way to prevent the inter-mixing of the primer surfacer and basecoat and clearcoat layers when applied in a wet on wet on wet (i.e., a 3 wet) manner and make it possible to eliminate the primer baking process and reduce the environmental impact of the coating system, while also maintaining film builds, the overall appearance such as high gloss and distinctness of image and film properties of the coating system.

The present invention has the aforementioned desirable characteristics.

SUMMARY OF THE INVENTION

Disclosed herein is a method for forming a multi-layer coating comprising sequentially applying a layer of a primer coating composition, a layer of a base coating composition and a layer of a clear coating composition on a substrate; and simultaneously curing the applied three layers by baking, wherein the primer coating composition comprises: a film forming binder and an organic liquid carrier, and optionally pigment(s) in a pigment to binder weight ratio of about 1:100-150:100; and the binder contains about:

(a) 40 to 95% by weight, based on the weight of the binder, of a caprolactone modified branched acrylic polymer having a hydroxyl and/or carboxyl monomer content, all or part of which has been reacted with a cyclic lactone, of about 1 to 65% by weight and a weight average molecular weight of about 10,000 to 150,000; and (b) 5 to 60% by weight, based on the weight of the binder of a crosslinking agent selected from the group consisting of an aminoplast resin, a blocked polyisocyanate resin, or a mixture thereof.

Also disclosed is a multi-layer coating, comprising: a primer surfacer; a pigmented basecoat; and a clearcoat applied over the basecoat, wherein the primer surfacer is the multi-layer coating prepared by the above method.

A further disclosure is a primer coating composition comprising a film forming binder and an organic liquid carrier, and optionally pigment(s) in a pigment to binder weight ratio of about 1:100-150:100; and the binder contains about:

(a) 40 to 95% by weight, based on the weight of the binder, of a caprolactone modified branched acrylic polymer having a hydroxyl and/or carboxyl monomer content, all or part of which has been reacted with a cyclic lactone, of about 1 to 65% by weight and a weight average molecular weight of about 10,000 to 150,000; and (b) 5 to 60% by weight, based on the weight of the binder of a crosslinking agent selected from the group consisting of an aminoplast resin, a blocked polyisocyanate resin, or a mixture thereof.

Also disclosed herein is a substrate coated with a dried and cured layer of the above composition of claim.

Yet another disclosure is a method for obtaining normal film builds on an automotive substrate using a 3-layer wet paint system without a primer bake, which method comprises, (a) applying a layer of the primer composition above to a substrate;

(b) applying a layer of a base coating composition wet-on-wet over said layer of primer composition;

(c) applying a layer of a clearcoat composition wet-on-wet over said layer of base coating composition;

(d) curing the applied three weight layers together in a single bake.

The present invention now provides a method and a primer coating composition for forming a multi-layered coating, which is capable of controlling intermixing of adjacent paint layers, and interfacial bleeding, and inversion at the interface between each coated layer when a primer coating, a base coating, and a clear coating are applied sequentially over each other in a wet-on-wet (i.e., wet-on-wet-on-wet) manner on a substrate before being baked together, while still meeting today's performance requirements such as good appearance, chip performance, and film builds.

BRIEF DESCRIPTION OF THE DRAWINGS

FIG. 1 is a schematic diagram of a three-layer wet paint application process in accordance with the present invention.

FIG. 2 is a schematic diagram of a conventional automotive coating process that requires a separate primer spray booth and primer baking process.

DETAILED DESCRIPTION OF THE INVENTION

Figure 3:
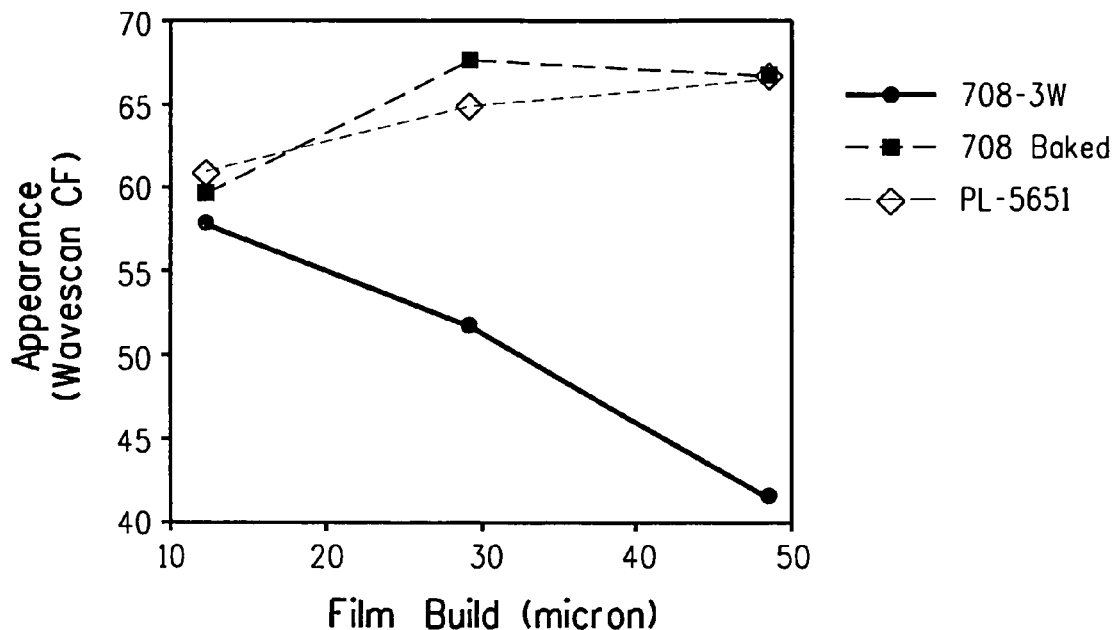
FIG. 3 is a graph showing the appearance of a horizontally baked panel coated by the process of this invention.

More particularly, the present invention provides a method for forming a multi-layer coating of automotive quality and appearance on a substrate without the need for a primer bake and the need to reduce film builds below normal commercial levels, comprising the steps of sequentially applying a primer coating composition, a basecoating composition, and a clear coating composition in a wet-on-wet manner on an automotive substrate, such as over the entire vehicle body or part thereof, preferably on which an electrodeposition coated film has been formed, and simultaneously curing the applied three layers by baking, wherein the primer coating composition comprises: a film-forming binder and an organic liquid carrier, and optionally, but preferably, pigment(s); and the binder contains about:

(a) 40 to 95% by weight, based on the weight of the binder, of a substantially non-gelled, caprolactone-modified branched acrylic polymer as the interfacial control polymer having a hydroxyl and/or carboxyl monomer content of about 1 to 65% by weight, all or part of which is reacted with caprolactone, and optionally containing other functionalized monomers for improved crosslinking, and having a weight average molecular weight of about 10,000 to 150,000; and (b) 5 to 60% by weight, based on the weight of the binder of a crosslinking agent selected from the group consisting of aminoplast resin, blocked polyisocyanates, or mixtures thereof; and wherein the composition is, preferably, essentially free to totally free of crosslinked NADs or crosslinked microgel resin particles or both.

The composition is also preferably formulated as a low VOC, high solids composition having a total solids content of about 40-70% by weight at the time of application.

The invention is based on the discovery that use of certain relatively high molecular weight caprolactone-modified branched acrylic polymers in the primer composition, which serve as interfacial control polymers, enables the composition to effectively prevent intermixing of the primer and basecoating layers when the basecoat which follows is applied over the primer in a wet on wet manner, while still providing an aesthetic appearance and film properties such as chip resistance and solids content and film builds equal to that of conventional baked primers.

The invention also provides a high solids solvent-borne primer coating composition comprising the aforesaid ingredients (a) to (b), for use in the aforesaid method for forming a multi-layer coating. The behavior of the primer defined above allows for high film builds, excellent appearance such as high gloss, distinctness of image, and desired visual (such as metallic or pearlescent) effect, and excellent chip resistance (a minimum rating of 5 using SAE J-400), despite the absence of a primer bake.

Also included within the scope of this invention is a substrate, such as a vehicle body or part thereof, coated by the method and with the coating composition disclosed herein.

The invention is especially useful for finishing the entire exterior body of automobiles and trucks and parts thereof.

In this disclosure, a number of terms and abbreviations are used. The following definitions are provided.

"Wet-on-wet" means that an overlying coat is applied to an underlying coat without curing (i.e., baking) or completely drying the underlying coat.

"Wet-on-wet on-wet", also used interchangeably herein with "three layer wet", "3 wet", and "3-coat-1-bake", means that the primer layer, basecoat layer, and clearcoat layer are applied successively in a wet-on-wet manner.

"Essentially free" with respect to the primer coating shall mean that the primer coating composition contains less than 1% by weight, preferably zero percent by weight, of the specified component, based on the total weight of the composition.

"High solids composition" means a low solvent solvent-borne liquid coating composition having a total solids content at time of application of at least 40 percent, preferably in the range of from 40-70 percent, in weight percentages based on the total weight of the composition. It should be understood that "total solids" refers to the total amount of non-volatile components in the composition even though some of the components may be non-volatile liquids rather than solids at room temperature.

"Caprolactone-modified acrylic polymer" means a polyester-extended acrylic polymer that has been extended with caprolactone such as epsilon-caprolactone. The polyester chain extension may be at a chain end or it may at any other point along the acrylic backbone. Of course, one skilled in the art would understand that other cyclic lactones can be used instead of caprolactone and is intended to be included in this definition, unless otherwise indicated.

"Substantially non-gelled" or "non-gelled" refers to reaction products that are substantially free of crosslinking and that have a measurable intrinsic viscosity when dissolved in a suitable solvent for the polymer. As is well known in the art, the intrinsic viscosity of a polymer is determined by plotting the reduced viscosity versus the concentration and extrapolating to zero concentration. A gelled reaction product is essentially of infinite molecular weight and will often have an intrinsic viscosity that is too high to measure.

"Low VOC composition" means a coating composition that has less than about 0.6 kilogram of organic solvent per liter (5 pounds per gallon) of the composition, preferably in the range of less than about 0.42 kilogram of organic solvent per liter (3.5 pounds per gallon), as determined under the procedure provided in ASTM D3960.

Primer Coated Layer

In the present method for forming a multi-layer coating, a novel primer surfacer coating composition having the ability to prevent inter-mixing of the top coated layer when applied wet-on-wet thereover is employed. This primer surfacer, primer filler, or chip resistant primer, hereinafter "primer", can be used in the three layer wet paint method described herein without sacrificing good finished appearance and good chip performance and good film builds.

The solvent-borne primer composition is not only useful in a wet-on-wet application process, it can be formulated to have a low VOC content (volatile organic content), can be formulated into a gray or colored composition that is easy to hide, forms finishes that are hard but still flexible, has excellent adhesion to a variety of substrates such as cold rolled steel, phosphatized steel, phosphatized steel primed with an electrocoat primer applied by electrocoating, plastic substrates which may be preprimed or unprimed such as polyester reinforced fiber glass, reaction injection molded urethanes, partially crystalline polyamides and other plastic substrates and provides a surface to which conventional topcoats will adhere.

The primer composition is particularly useful on the aforementioned substrates since it can be used as a surfacer or filler to cover imperfections in surfaces of primed metal and plastic substrates. For example, electrocoating of metal substrates with a primer often results in a finish that has small imperfections and this composition can be applied to form a smooth, glossy finish that is free from imperfections. Also, plastic substrates such as SMC (sheet molding compound) which is a polyester reinforced with fiber glass contains many surface imperfections and must be coated with a surfacer.

The novel primer composition of this invention generally contains a film forming binder and a volatile organic liquid carrier, which usually is a solvent for the binder. It is generally desired that the composition be formulated as a low VOC composition. Accordingly, for low VOC compositions, the primer composition typically has a film forming binder content of about 40-85% by weight and correspondingly about 15-60% by weight of volatile organic liquid carrier. Generally, the composition also contains pigments in a pigment to binder weight ratio of about 1:100-150:100.

As indicated above, the film-forming portion of the primer composition of this invention is referred to as the "binder" or "binder solids". The binder generally includes all the film-forming components that contribute to the solid organic portion of the cured composition. Generally, catalysts, pigments, and non-polymeric chemical additives such as stabilizers described hereinafter are not considered part of the binder solids. Non-binder solids other than pigments usually do not amount to more than about 5-15% by weight of the composition. In this disclosure, the term "binder" or "binder solids" refers to the film-forming caprolactone-modified branched acrylic polymer, the melamine or polyisocyanate crosslinking agent, and all other optional film-forming components, as are further described hereinbelow.

In a preferred embodiment, the binder or film forming constituent used in the composition generally comprises about 40-95% by weight of the aforesaid substantially non-gelled, caprolactone-modified branched acrylic polymer, which is sometimes referred to herein as "highly branched" or "hyper branched" or "branched" acrylic polymer, and about 5-45% by weight of an aminoplast resin cross-linking agent. It should be understood that a blocked polyisocyanate crosslinking agent can be used to replace some portion or all of the aminoplast, if desired. Blocked polyisocyanates are however known to increase the overall cost of the composition and therefore are less desirable. For most uses, the composition typically contains about 65-75% by weight of caprolactone-modified branched acrylic polymer and 25-35% by weight of aminoplast resin cross-linking agent.

In general, the substantially non-gelled caprolactone-modified branched acrylic polymer has a Mw (weight average molecular weight) of about 10,000 to 150,000, more preferably in the range from about 30,000 to 120,000, a hydroxyl and/or carboxyl monomer content of about 1 to 65% by weight; and caprolactone mols of about 0.25 to 6 per mole to hydroxyl and/or carboxyl in the mixture being polymerized, preferably about 2 moles of caprolactone per mole of hydroxyl. In a preferred embodiment, the polymer is essentially free of carboxyl functional groups.

All molecular weights described herein are determined by gel permeation chromatography using polystyrene as the standard.

While not wishing to be bound by theory, the inclusion of the forgoing acrylic polymer is believed to act as an interfacial control polymer and thus prevent intermixing of the wet primer and basecoating layers by (1) decreasing permeability of the primer enough to prevent bleeding, but still maintaining sufficient low viscosity so as to enable easy application such as by spraying, without the need to employ appreciable amount of volatile solvents, and/or by (2) choosing a chemistry, primarily acrylic chemistry, that is preferably immiscible with the layer that follows which is the basecoat layer.

In order to form the desired branched caprolactone-modified acrylic polymer, the polymer is preferably composed of caprolactone and at least two types of ethylenically unsaturated monomers, namely 1) at least one monoacrylic monomer and 2) at least one diacrylic or dimethacrylic monomer. Optionally the polymer may additionally contain 3) at least one monomethacrylic monomer, provided that it does not exceed 40% by weight of the total reaction mixture. In a preferred embodiment, the monomer mixture contains no more than 30% by weight diacrylic and/or dimethacrylic monomers in total, to minimize gel formation under the above described reaction conditions.

A portion of the ethylenically unsaturated monomer structures mentioned above should also contain a hydroxyl and/or carboxyl group or other group containing an active hydrogen capable of reacting with the caprolactone monomer in order to chain extend the polymer with the lactone and also to provide crosslinking functionality to the polymer. Hydroxyl groups are generally preferred. Examples of hydroxyl containing monoethylenically unsaturated monomers that can be used to introduce such hydroxyl groups are hydroxyalkyl acrylates and hydroxyalkyl methacrylates such as: 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate. Another example of a hydroxyl functional (meth)acrylate monomer, which is useful herein, is one which has already been reacted with caprolactone such as TONE M-100®, a product of Union Carbide which is the reaction product of one mole of 2-hydroxyethyl acrylate with 2 moles of epsilon-caprolactone.

Examples of carboxyl containing monoethylenically unsaturated monomers are: acrylic acid, methacrylic acid, itaconic acid, maleic acid, fumaric acid, and crotonic acid. The amount of hydroxyl and/or carboxyl functionality may vary, depending on the final properties desired. In a preferred embodiment, up to 65%, preferably from 5 to 40%, more preferably from about 10 to 20%, by weight of the monomer mixture contains hydroxyl and/or carboxyl functionality to allow the polymer to be chain extended and have the desired crosslinking functionality, high molecular weight and intermixing or strike-in resistance but still sufficiently low viscosity.

Optionally, besides the hydroxyl and/or carboxyl groups mentioned above, the caprolactone modified branched acrylic polymer may contain additional functional groups (up to about 65% by weight functional monomers in the monomer mixture) such as amino, carbamate, alkoxy silane such as trimethoxy silane, epoxy and the like, to impart additional crosslinking functionality to the polymer and enhance the integrity of the cured coating. Of course, the amount of functional groups may vary, depending on the final properties desired. These functional groups can be introduced by employing a functional monomer containing the desired group in the polymerization process or by post-reaction of a polymer of the invention to introduce the desired additional functionality, as will be apparent to those skilled in the art.

Examples of such functional monomers are silane-containing monomers, particularly alkoxy silanes such as gamma-acryloxypropyl trimethoxysilane, gamma-methacryloxypropyl trimethoxysilane (Silquest® A-174 from Crompton), and gamma-methacryloxypropyltris(2-methoxyethoxy) silane. Examples of useful amine-containing monomers are N,N-dimethylaminoethyl methacrylate (tertiary amine), N,N-dimethylaminoethyl acrylate (tertiary amine), N-t-butylaminoethyl methacrylate (secondary amine), N-t-butylaminoethyl acrylate (secondary amine), 2-aminoethyl methacrylate hydrochloride (primary amine), and the like. Examples of useful epoxy containing monomers are glycidyl methacrylate and glycidyl acrylate and any acrylic monomer with a hydroxyl group that can be reacted with epichlorohydrin to produce the epoxy group containing monomers. Examples of useful carbamate containing monomers include adducts of aliphatic alcohols with 2-isocyanatoethyl methacrylate. Methods for preparation if carbamate functionalized acrylics are well known in the art and described, for example, in EP 0 594 142 B1 and EP 0 719 795 B1, the disclosures of which are hereby incorporated by reference herein.

Typically, the remainder of the ethylenically unsaturated monomers in the monomer mix will be non-functional monomers containing no carboxylic acid groups, hydroxyl groups or other reactive or crosslinkable functional groups.

Examples of non-functional monoacrylic and methacrylic monomers are alkyl acrylates and methacrylates such as: methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, propyl acrylate, phenyl acrylate, isobornyl acrylate, methyl methacrylate, ethyl methacrylate, butyl methacrylate, t-butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate and the like, or other constituents such as styrene or substituted styrene, such as methyl styrene, acrylonitrile, and methacrylonitrile, acryamide, and methacrylamide, and the like.

Examples of diacrylic and methacrylic monomers for use as a co-monomer in the monomer mix to impart branching are diesters of acrylic and methacrylic acids, such as: ethylene glycol dimethacrylate and diacrylate, diethyleneglycol dimethacrylate and diacrylate, triethyleneglycol dimethacrylate and diacrylate, 1,3-propanediol dimethacrylate and diacrylate, 1,4-butanediol diacrylate, 1,6-hexanediol diacrylate, 2,2-dimethylpropanediol diacrylate, tripropylene glycol dimethacrylate and diacrylate, 1,3-butylene glycol dimethacrylate and diacrylate.

Urethane diacrylates and dimethacrylates can also be used, since they impart in coating applications, increased flexibility to the cured coating layer and reduced brittleness, when used in the correct proportion with the other essential ingredients in coating applications. The urethane monomers can be produced by any of the methods known to those skilled in the art. Two typical methods are 1) reacting a diisocyanate with a hydroxy-containing acrylate or hydroxy-containing methacrylate, such as 2-hydroxyethyl acrylate or 2-hydroxyethyl methacrylate; and 2) reacting an isocyanatoalkyl acrylate or an isocyanatomethacrylate with a suitable diol. Some of the diethylenically unsaturated monomers, as can be seen from the list of these monomers above, may also contain a functional group, such as any of those listed above, to impart crosslinking functionality to the polymer.

As mentioned above, the polymer may also contain some monomethacrylic monomers. However, when such monomers are employed in the free-radical polymerization reaction, it is desired that the total amount of monomethacrylic monomers in the monomer mixture should not exceed approximately 40% by weight. Higher amounts can be used but at amounts exceeding 40% by weight, such monomers begin to interfere with the branching mechanism (or so-called "backbiting" described hereafter) and thus result in a polymer of a lower degree of branching, as demonstrated by a sharp rise in viscosity, which is undesirable. The products formed at such concentrations are quite viscous and difficult to handle.

In addition, among the mono acrylic and methacrylic monomers listed above, it is generally desired to include (up to about 70% by weight of the monomer mixture) of at least one bulky monomer selected from the group consisting of isobornyl (meth)acrylate, butyl (meth)acrylates (all isomers), ethyl hexyl(meth)acrylate (all isomers), cyclohexyl(meth) acrylate, or mixture of these monomers, preferably to increase the intermixing or strike-in resistance of the coating composition with overlying coating layers applied wet-on-wet thereover.

Also, since the intended end use of the branched acrylic polymer product is in a high solids primer coating composition, the amount of diacrylic or dimethacrylic monomer(s) will generally not exceed 30% by weight of the total monomer mixture to avoid gelation, although this may vary depending on the particular diacrylic or dimethacrylic monomers employed, as well as the composition of the monomer mixture.

In a preferred embodiment, the branched acrylic polymer is composed of polymerized monomers of a first acrylate monomer which is either isobornyl acrylate, butyl acrylate (all isomers), ethyl hexyl acrylate (all isomers), or cyclohexyl acrylate, or mixture of these monomers, and a second methacrylate or acrylate monomer which is either a hydroxy alkyl methacrylate or acrylate that has 1-4 carbon atoms in the alkyl group, or a carboxyl containing acrylic or methacrylic monomer, or mixtures of these monomers, a diacrylate or dimethacrylate monomer or a mixture of these monomers, and polymerized caprolactone grafted thereto, wherein all or part of the hydroxyl and/or carboxyl groups are reacted with caprolactone to form the lactone graft chain on the branched acrylic polymer either prior to, during, or after free-radical polymerization.

One especially preferred branched acrylic polymer contains about 40-98% by weight of the first acrylate, 1-30% of the second acrylate or methacrylate, and 1-30% by weight of the diacrylate or dimethacrylate. Of course, the total percentage of monomers in the polymer equal 100% and therefore if an amount equal to or approaching the maximum of one particular monomer is employed, then the relative amounts of the remaining monomers must be reduced accordingly.

One particularly preferred branched acrylic polymer contains the following constituents in the above percentage ranges: isobornyl acrylate, hydroxy ethyl methacrylate, and 1,6-hexanediol diacrylate, wherein the hydroxyl groups are reacted with caprolactone, preferably epsilon-caprolactone, to form the lactone graft on the branched acrylic polymer.

Of course other cyclic lactones can also be used, as will be apparent to those skilled in the art. Besides episilon-caprolatcone, some of the suitable lactones include gamma-caprolactone; gamma-butyrolactone; gamma-valerolactone; delta-valerolactone; gamma-butyrolactone; and lactones of the corresponding hydroxy carboxylic acids, such as, glycolic acid; lactic acid; 3-hydroxycarboxylic acids, e.g., 3-hydroxypropionic acid, 3-hydroxybutyric acid, 3-hydroxyvaleric acid, and hydroxypyvalic acid. However, the most preferred of these is epsilon-caprolactone.

The caprolactone-modified branched acrylic polymer described above can be prepared by a variety of solution polymerization methods in which the monomers are blended with a liquid reaction medium, a free radical polymerization initiator, optionally caprolactone, optionally caprolactone modified monomer, optionally a polymerization catalyst for the caprolactone, and optionally a chain transfer agent, and heated to a relatively high temperature of typically at least 130° C., preferably at least 150° C., more preferably at least. 160° C., for a sufficient time, as will be apparent to those skilled in the art, typically for about 2 to 8 hours to form a substantially non-gelled branched polymer. In general, at temperatures below 130° C., the amount of internal crosslinking increases and also the relative amount of by-products increases. Furthermore, at too low a reaction temperature, the viscosity of the reaction mixture rapidly increases to a point where the reaction mixture is too viscous to be stirred and the reaction is then difficult to control and must be terminated. When the caprolactone is not included in this process, it is added to the preformed branched acrylic polymer along with a polymerization catalyst for the caprolactone and heated to 75° C. to 165° C. for a sufficient time, as will be apparent to those skilled in the art, typically for 2 to 8 hours to form a caprolactone-modified branched acrylic polymer.

As indicated above, the free radical polymerization portion of the process used herein to form the branched acrylic polymer backbone may be carried out utilizing conventional techniques, such as by heating the monomers in the presence of initiators and/or catalysts and varying solvents, with the proviso that the reaction temperature during polymerization must be high enough (i.e., generally above 130° C.) to induce branching without causing the polymer to gel.

While not wishing to be limited by any particular mechanism, it is believed that the high temperature free-radical polymerization process used herein involves so-called "backbiting" which prevents gelation of the monomer mixture. In the polymerization process described, it is believed that abstraction of a methine backbone hydrogen occurs to give a tertiary radical which leads to formation of a branching point and ultimately a branched polymer through subsequent monomer addition. Abstraction of the hydrogen from the backbone is believed to occur by intramolecular chain transfer, or so-called backbiting, which best accounts for the observed branching, as opposed to formation of a gelled polymer, as would be expected to normally occur in classical free radical polymerization that utilizes greater than insignificant amounts of diacrylate or dimethacrylate monomers. Such backbiting reactions in high temperature acrylate polymerization are described more fully in Peck and Grady, *Polym. Preprints,* 2002, 43(2), 154, hereby incorporated by reference.

In the present invention, it has been unexpectedly observed that even in the presence of diacrylic or dimethacrylic monomers, higher reaction temperatures favor this backbiting, with little or no gelled polymer being formed. It was previously thought that the presence of large amounts of diacrylic or dimethacrylic monomers in the reaction mixture would cause the reaction mixture to gel. The process disclosed therefore employs rather high reaction temperatures to increase the incidence of backbone hydrogen abstraction and increase the incidence of branching. Increasing the number of branching points on a polymer chain leads to lower viscosity. It is well known that the inherent viscosity of branched polymers is lower than for corresponding linear polymers of equal molecular weight, which allows the branched acrylic polymer so formed to be used in a high solids coating with viscosity low enough for practical application such as by spraying.

The free radical polymerization portion of the process that is used to form the acrylic polymer backbone and branched structure is preferably carried out in the presence of a free radical polymerization initiator, typically, tertiary butyl perbenzoate, tertiary butyl peroctoate, cumene hydroperoxide, benzoyl peroxide, di-tertiary butylperoxide, di-cumene peroxide, methyl ethyl ketone peroxide or similar peroxygen compounds, or an azo compound such as azobisisobutyronitrile is employed. The amount of free radical polymerization initiator can be varied depending upon the desired molecular weight but about 0.05-8% by weight based on the weight of total polymerizable monomer is typical. A preferred range is from 0.05 to 4 percent by weight. A mixture of two or more initiators may be used.

A solvent is not essential but is preferably used as the liquid reaction medium. The solvent can be used at from 0 to about 75% of the total reaction mixture preferably from 30 to 55 percent by weight of the reaction mixture. Any of the conventional polymerization solvents may be utilized in the present high temperature process to prepare the branched acrylic polymers. The higher boiling solvents are preferred due to their low vapor pressure at the high temperature required to induce branching. In general, solvents having a boiling point above 100° C., especially 150° C. are most preferred. Examples of such higher boiling solvents include esters and mixed ethers and esters, Cellosolve (registered trademark of the Union Carbide Corporation), butyl Cellosolve, Cellosolve acetate, the Carbitols (registered trademark of the Union Carbide Corporation), the (poly) alkylene glycol dialkyl ethers and the like. Any solvent is acceptable as long as the functionality of the solvent does not interfere with the monomer functionality. The reaction may also be run under pressure so that the boiling point of a low boiling solvent can be increased to temperatures desired to produce the polymers of the present invention.

Further, various hydrocarbon fractions may be utilized with the most preferred being Solvesso 150 or Solvesso 100 (a registered trademark of the Exxon Mobil Oil Company). Aromatic solvents can also be employed, for example, toluene, xylene, cumene, and ethyl benzene. Special care is exercised when functional solvents are desired. Acid, alcohol and amine functional solvents have the potential of reacting with caprolactone, and therefore should not be introduced until the caprolactone has been reacted with the desired site on the branched acrylic polymer.

Once the monomers capable of reacting with a cyclic lactone or monomers which have been pre-reacted with lactone are included in the reaction mixture, several different processing methods can be used to chain extend the branched acrylic polymer with the cyclic lactone and prepare the final caprolactone modified branched acrylic polymers. The main differences involve the specific point where the lactone, preferably caprolactone, is introduced into the reaction process.

One method useful in the present invention is to pre-react the desired lactone with the carboxyl or hydroxyl functional ethylenically unsaturated monomer in the presence of a suitable catalyst to form a new lactone extended monomer with an ethylenically unsaturated (preferably acrylic or methacrylic) double bond and a pendant hydroxyl or carboxyl group. The molar ratio of lactone to ethylenically unsaturated carboxyl or hydroxyl monomer can range from about 0.1 to 20 moles, preferably 0.25 to 6 moles, most preferably 1 to 3. A typical example of such a monomer is TONE M-100®, a product of Union Carbide which is a reaction product of one mole of 2-hydroxyethyl acrylate with 2 moles of epsilon-caprolactone.

In a second method, the lactone is charged to the reactor along with the organic solvents. These materials are heated to reaction temperature and the ethylenically unsaturated monomers are added along with a free radical catalyst and reacted in the presence of the solvent and the lactone. A catalyst for the lactone polymerization may be added concurrently with the acrylic monomers or may be added prior to the addition of these monomers. The temperature is held for a sufficient time, as will be apparent to those skilled in the art, to form the desired chain extended branched acrylic polymer.

In a third method, the branched acrylic polymer is first formed via a high temperature polymerization process. When this process is complete, the desired lactone is then added along with a catalyst for the lactone polymerization and the desired product is formed.

In all cases, the molar ratio of lactone to ethylenically unsaturated carboxyl or hydroxyl monomer added to the reaction mixture can vary. The molar ratio typically ranges from about 0.1 to 20, more preferably from about 0.25 to 6. One skilled in the art would be able to vary the amount of polymerization catalyst, the reaction temperature, and other conditions to affect the lactone polymerization.

In addition to the free radical polymerization catalyst, the polymerization medium could include a polymerization catalyst when caprolactone is used in the composition.

Typically this caprolactone catalyst may be an alkali or alkaline earth metal alkoxide, e.g. sodium or calcium methoxide; aluminum isopropoxide, organotin compounds, e.g., dibutyl tin dilaurate, dibutyl tin diacetate, stannous octoate, and dibutyl tin oxide tetraalkyl titanates, titanium chelates and acylates, lead salts and lead oxides, zinc borate, antimony oxide, stannous octoate, organic acids, inorganic acids such as sulfuric, hydrochloric, and phosphoric, and Lewis acids such as boron trifluoride. The preferred catalyst is dibutyl tin dilaurate.

In any of the processes described above, polymerization is preferably continued until the resulting film-forming branched acrylic polymer has the desired molecular weight and requisite branching and crosslinking functionality and desired intermixing and strike-in resistance but still sufficiently low viscosity for use in the primer coating composition of the present invention.

In addition to the above film-forming branched acrylic resin component, the primer composition also contains, as part of the film-forming binder, a crosslinking agent. The crosslinking agent used in the composition is an aminoplast resin or blocked polyisocyanate resin or mixture of the two. Aminoplasts resins such as melamine formaldehyde condensates are generally preferred. In general, aminoplast resins are aldehyde condensation products of melamine, urea, benzoguanamine, or a similar compound. Usually, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amine group is present can also be employed.

Of the melamine condensates, monomeric or polymeric melamine formaldehyde condensate resins that are partially or fully alkylated are generally preferred. These preferred resins are organic solvent-soluble and are commercially available under the tradename Cymel® from Cytec Industries, Inc., West Patterson, N.J. One preferred crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Another preferred melamine, for a good balance of properties is, a fully butylated resin known as Cymel 1156®.

Other possible crosslinking agents, of course, can also be used, such as urea formaldehyde, benzoquanamine formaldehyde and blocked or unblocked polyisocyanates or compatible mixtures of any of the forgoing crosslinkers.

For instance, the aminoplast crosslinking agent(s) described above can be substituted for or optionally combined with any of the conventional blocked polyisocyanate crosslinking agents for enhanced film properties. Typical blocking agents are alcohols, ketimines, oximes, pyrazoles and the like.

Typical examples of polyisocyanates are isocyanate compounds having 2 to 4 isocyanate groups per molecule, such as 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Polyisocyanates having isocyanurate structural units can also be used such as the isocyanurate of hexamethylene diisocyanate which is available under the tradename Desmodur N-3390® from Bayer Corporation of Pittsburgh, Pa., the isocynaurate of isophorone diisocyanate (isocyanurate) which is available under the tradename Desmodur Z4470® from Bayer Corporation and the like.

Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is available under the tradename of Cythane 3160®. When the crosslinkable resin of the present invention is used in exterior coatings, the use of an aliphatic or cycloaliphatic isocyanate is preferable to the use of an aromatic isocyanate, from the viewpoint of weatherability and yellowing resistance. An example of a suitable blocked isocyanate that can be used in the present system is a pyrazole blocked polyisocyanate of 1,6-hexamethylene diisocyanate which is available from Bayer Corporation.

Optionally, in addition to the above film-forming binder constituents, the composition may also contain, as part of the film-forming binder, other film-forming binder resins and/or crosslinking resins, such as acrylic resins, acrylourethane resins, alkyd resins, epoxy resins, polyester resins, polyester urethane resins, and the like. However, as indicated above, the composition should be totally free or essentially free of crosslinked microgel resin particles based on, for example, acrylic microgels, and crosslinked NAD resin particles, based on, for instance, acrylic NADs, as part of the film-forming binder. If the overlying basecoating layer is formed from a polyester based coating composition (e.g., a standard polyester-melamine base coating), it is generally desired that the primer composition also be free of any of the aforesaid polyester binder resins, in order to further raise the solubility parameter between the two layers.

Besides the film-forming binder constituents, the coating composition of the present invention may also include minor amounts of non-binder solids. Generally, catalysts, pigments, or chemical additives such as stabilizers are not considered part of the binder solids. Non-binder solids other than pigments, as indicated above, usually do not amount for more than about 5-15% by weight of the composition. Such additional additives will, of course, depend on the intended use of the coating composition.

For instance, to increase the rate of crosslinking of the composition on curing, a catalyst can be added to the composition. Generally, about 0.1-6% by weight, based on the weight of the binder, of catalyst is used. Typical of such catalyst are blocked acid catalysts. Typically useful blocked acid catalysts are aromatic sulfonic acids blocked with amino methyl propanol or dimethyl oxazoline. Typically useful aromatic sulfonic acids are para toluene sulfonic acid, dodecyl benzene sulfonic acid, decyl benzene sulfonic acid. One preferred catalyst is dodecyl benzene sulfonic acid blocked with amino methyl propanol.

To improve the outdoor weatherability of the composition and protect the coated substrate from premature degradation, the composition typically contains about 0.01-2% by weight, based on the weight of the binder, of ultraviolet light stabilizers which term includes ultraviolet light absorbers, screeners and quenchers. Typical ultraviolet light stabilizers include benzophenones, triazines, triazols, benzoates, hindered amines and blends thereof.

Typical pigments that can be used in the composition are filler pigments such as talc, china clay, barytes, carbonates, silicates, and color pigment such as metallic oxides such as titanium dioxide, zinc oxide and iron oxide and carbon black and organic colored pigments and dyes. The resulting primer composition has a pigment to binder weight ratio of about 1:100-150:100.

The pigments can be introduced into the primer composition by first forming a mill base with an acrylic copolymer dispersant or with another compatible polymer or dispersant by conventional techniques such as sand grinding, ball milling or attritor grinding. The mill base is blended with other constituents used in the composition.

In general, a gray color primer prepared by using carbon black and titanium dioxide as main pigments is typically employed. However, various color pigments may be employed to provide various colors for example that having a hue similar to that of the colored basecoat layer that is subsequently applied directly thereover. This is done to enable the colored basecoat to achieve complete hiding at the lowest possible film build. In addition, it is generally desirable to include small amounts of talc in the composition to improve the chipping resistance of the coating film.

As to the liquid carrier, any of the conventional organic solvents or blends of solvents can be used to form the primer composition provided that the selection of solvents is such that the polymeric binder constituents are compatible and give a high quality primer coating. The following are examples of solvents that can be used to prepare the composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used. The proportion of solvents is not critical, since they primarily serve as the volatile vehicle to convey the solid material to the substrate to be coated. The solvent is preferably employed in an amount to provide a stable concentrate that can be shipped to assembly plants which is later reduced with solvent to a suitable spray viscosity for ease of application.

In addition to the above ingredients, the composition may also include other conventional formulation additives such as toughening agents, and flow control agents, for example, such as Resiflow® S (polybutylacrylate), BYK® 320 and 325 (high molecular weight polyacrylates). Such additional additives will, of course, depend on the desired final properties of the coating composition, as will be apparent to those skilled in the art. In addition, conventional rheologically active agents, such as Garamite® clay, fumed silica, urea sag control agents, and the like can also be used, for enhanced intermixing resistance.

As indicated above, high solids primer compositions are generally preferred for use in the multi-layer coating process of this invention. The primer coating composition preferably has a total solids content (% non-volatile) of about 40 to 70% by weight at the time of application, and preferably between 50 and 65% by weight, based on the total weight of the coating composition, in order to keep air pollution to a minimum level. High solids coatings behave like low solids liquid coatings but have the additional benefit of lower solvent content and significantly reduced emissions.

The volatile organic content or VOC level at such solids typically translates to less than about 3.5 pounds of organic solvent per gallon of curable composition, as determined under the procedure provided in ASTM D3960. It should be understood however, that additional solvent may be added, if necessary, at the time of application to adjust the spray viscosity and control the flow and leveling of the coating and provide other desirable properties, as will be apparent to those skilled in the art.

The primer composition can be applied to a plastic or metal substrate by conventional techniques such as spraying, electrostatic spraying, dipping, brushing, flowcoating and the like.

Base Coated Layer

In the method for forming the multi-layer coating according to the present invention, a colored base coating material is employed for forming a base coated layer. The base coated layer forms a top coated film together with a clear coated layer which will be described later. This base coating composition contains a film forming resin, usually a curing agent, a color pigment and optionally an effect pigment, to impart a special visual effect such as sparkle, pearlescent, luminescent, and/or metallic appearance or an increased depth of color to the cured coating composition.

Any of the conventionally known basecoat compositions can be used in the method of the invention. In general, the composition of the basecoat is not limited by the present invention. The base coating composition may be a solvent type or a water-borne type.

Examples of film forming resins contained in the base coating material include, but are not limited to, polyester resins, acrylic resins, alkyd resins, epoxy resins, urethane resins and the like, and resins may be employed alone or in combination. The film forming resin can be employed in combination with a curing agent. Examples of the typical curing agents include amino resins such as melamine formaldehyde condensates and/or blocked isocyanate resins.

An example of a typical high solids solvent borne basecoat, in addition to color pigments, optional aluminum flakes, and UV absorber, comprises by weight of composition, about 10% microgel for rheology control, 21% melamine formaldehyde resin, 15% branched polyester resin, 5% hydroxy functional acrylic resin, 1% dodecyl benzyl sulfonic acid catalyst, and 40% solvent to disperse and/or dilute the above mentioned polymers and facilitate spray application.

Clear Coated Layer

For forming the clear coated layer, a clear coating composition is employed. The clear coating composition is not particularly restricted and may be a clear coating material which contains a film forming resin, a curing agent and the like. The clear coating material may be a solvent type, a water-borne type or a powder type.

High solids solvent borne clear coats which have low VOC (volatile organic content) and meet current pollution regulations are generally preferred. Typically useful solvent borne clearcoats include but are not limited to 2K (two component) systems of polyol polymers crosslinked with isocyanate and 1K systems of acrylic polyol crosslinked with melamine or 1K acrylosilane systems in combination with polyol and melamine.

Suitable 1K solvent borne acrylosilane clearcoat systems that can be used in the process of the present invention are disclosed in U.S. Pat. No. 5,162,426, hereby incorporated by reference. Suitable 1K solvent borne acrylic/melamine clearcoat systems are disclosed in U.S. Pat. No. 4,591,533, hereby incorporated by reference.

Epoxy acid systems can also be used. Such finishes provide automobiles and trucks with a mirror-like exterior finish having an attractive aesthetic appearance, including high gloss and DOI (distinctness of image).

Substrate

The method for forming a coating of the present invention may be applied to various substrates such as metals, plastics and foamed bodies, and combinations thereof, preferably to metal surfaces and moldings, and more preferably to metal products on which cationic electrodeposition coated film has been formed.

Examples of the metal substrates include iron, copper, aluminum, tin, zinc and the like and alloys containing these metals, such as steel. Specific products include bodies and parts of automobiles such as passenger cars, trucks, motorcycles and buses.

The metal substrates that are particularly preferred are those preliminarily subjected to forming treatment with phosphate salt, chromate salt or the like.

The substrate may have an electrodeposition coated film on the surface subjected to forming treatment. The electrodeposition coated film may be formed from an anionic or a cationic electrodeposition coating material. However, a cationic electrodeposition coating material is preferred since it provides excellent corrosion resistance.

Examples of plastic substrates that can be coated according to the method of the present invention include polyester reinforced fiberglass, reaction-injection molded urethanes, partially crystalline polyamides, and the like or mixtures thereof, which may be primed or unprimed or otherwise treated as well prior to treating by the coating method described herein. These plastic substrates are oftentimes used in fabricating specific automotive body parts, such as fenders, bumpers, and/or trim parts.

Method for Forming Coating

According to the method for forming a multi-layer coating of the present invention, as exemplified in FIG. 1, a layer of primer coating composition 12 is formed on a substrate (automobile body 10 shown in FIG. 1) using the primer coating composition, then a layer of a base coating composition 14 is formed using the base coating composition and a layer of clear coat composition 16 is formed using the clear coating composition in this order in the wet-on-wet manner.

According to the present invention, when the three coating compositions described above are applied to automobile bodies, conventional coating methods such as spraying, electrostatic spraying, high speed rotational electrostatic bells, and the like, can be conducted. The preferred techniques for applying all three layers of coating compositions are air atomized spraying with or without electrostatic enhancement, and high speed rotary atomizing electrostatic bells, since these techniques are typically employed in modern automobile and truck assembly plants.

When the primer coating composition is applied to automotive bodies according to the present invention, any of the above techniques can be used.

The primer coating composition forms a cured layer having a thickness of usually 0.3 to 2.5 mils (7 to 60 μm), preferably 0.5 to 1.5 mils (12 to 36 μm), but the thickness may vary according to the intended use. If the thickness is more than the upper limit, image sharpness may deteriorate or a trouble such as unevenness or sagging may occur at the time of application. If it is less than the lower limit, the electroprimed substrate cannot be hidden, and film discontinuity may occur, which could expose the lower electrocoat layer to excess UV transmission and degradation.

On the uncured layer of primer coating composition, a layer of a base coating composition and a layer of a clear coating composition are applied in the wet-on-wet manner to form a base coated layer and a clear coated layer.

A layer of base coating composition may be applied, like the primer coating composition, using air-electrostatic spray coating or a rotary atomizing electrostatic bell so as to have a dry thickness of 0.4 to 1.2 mils (10 to 30 μm).

A layer of clear coating composition is then applied on the base coated layer, for the purpose of smoothing roughness or glittering which occurs due to the presence of luster color pigment and for protecting a surface of the base coated layer. The clear coating composition may be applied, like the base coating composition, using the rotary atomizing electrostatic bells.

The clear coated layer is preferably formed so as to have a cured thickness of about 1.0 to 3.0 mils, (25-75 μm).

The multi-layered coated layers obtained as described above are then cured (i.e., baked) simultaneously, as shown in FIG. 1, to form a layered coated film. This is what we call "three-coat-one-bake method." This method requires no oven for drying the primer coating layer before being base coated (which is required in the conventional process shown in FIG. 2), and is favorable from the economical and the environmental viewpoint.

The multi-layer coating is then cured in a curing oven at a curing temperature within the range of 100 to 180° C., preferably 130 to 160° C., so as to obtain a cured multi-layer coating with high crosslinking density. The curing time may vary depending on the curing temperature, however, a curing time of 10 to 30 minutes is adequate when the curing temperature is 130° C. to 160° C.

According to the process of the present invention, the multi-layered coating is formed so as to have a cured thickness of 3 to 5 mils (75 to 120 μm). It is important to have an adequate film build in each of the layers of the present invention, as a low film build will affect the appearance, mechanical properties, and the amount of UV transmittance to the underlying layers. Too low a film build can allow UV radiation to penetrate to the electrocoated layer. Most electrocoat layers are not formulated with UV absorbers and they tend to be very susceptible to UV degradation.

The following examples further illustrate the present invention, however, these are not to be construed as limiting the present invention to their details. All parts and percentages are on a weight basis unless otherwise indicated. All molecular weights disclosed herein are determined by GPC (gel permeation chromatography) using polystyrene as the standard. Unless otherwise specified, all chemicals and reagents can be obtained from Aldrich Chemical Company, Milwaukee, Wis.

EXAMPLES

The following branched acrylic copolymers were prepared and then used to form the following three wet primer coating compositions of this invention.

Example 1

Preparation of High Mw Caprolactone Modified Branched Acrylic Polymer

A 12-liter flask was equipped with a thermometer, stirrer, addition funnels, heating mantel, reflux condenser and a means of maintaining a nitrogen blanket over the reactants. The flask was held under nitrogen positive pressure and the following ingredients were employed.

|  | Weight (gram) |
|---|---|
| Portion 1 | |
| Solvesso 100 ® | 1758.6 |
| Portion 2 | |
| 1,6-Hexanediol diacrylate | 703.4 |
| Isobornyl acrylate | 3033.6 |
| Hydoxyethyl methacrylate | 659.5 |
| t-Butylperoxy acetate | 44 |
| Solvesso 100 ® | 703.4 |
| Portion 3 | |
| Epsilon-caprolactone | 885.3 |
| Solvesso 100 ® | 412.2 |
| Dibutyl tin dilaurate | 3.0 |
| Total | 8203 |

Portion 1 mixture was charged to the flask and the mixture was agitated and heated to reflux temperature. While maintaining the batch at reflux, Portion 2 was premixed and fed to the flask over a 5-hour period, and the reaction mixture was held at reflux temperature throughout the course of additions. Reflux was continued for another 60 minutes and Portion 3 was premixed and fed to the flask over a 30-minute period at reflux. After addition was completed the reaction temperature was raised to 150° C. and held for an additional 3 hours. Then the solution was cooled to room temperature and filled out. The weight solids of the resulting polymer solution was 65.8% and the Gardner-Holdt viscosity (ASTM D1545-98) measured at 25° C. was X. Weight average molecular weight of the polymer was 37690 and polydispersity was 11, determined by GPC.

Example 2

Preparation of 3 Wet Primer Containing Polymer Above

A gray colored primer surfacer composition was prepared by mixing together the following ingredients in a suitable mixing vessel in order shown:

| Components | Parts by Weight |
|---|---|
| Carbon Black Pigment Dispersion[1] | 0.47 |
| White Pigment Dispersion[2] | 19.00 |
| Butyl Acetate[3] | 2.03 |
| Iso Propanol[4] | 4.00 |
| Acid Catalyst Solution[5] | 1.50 |
| Monomeric Melamine Formaldehyde (99.8% NV)[6] | 8.00 |
| Amorphous Silica Dispersion[7] | 10.00 |

-continued

| Components | Parts by Weight |
|---|---|
| Hyperbranched Acrylic (65% NV)[8] | 50.00 |
| Barium Sulfate Pigment Dispersion[9] | 5.00 |
| Total | 100.00 |

Table Footnotes
[1]18% Solids of carbon black pigment dispersed in 19% solids of pigment dispersion agent in ester solvent.
[2]68% Solids of titanium dioxide pigment dispersed in acrylic resin in ester solvent.
[3]Butyl acetate solvent.
[4]Isopropanol solvent.
[5]48% of Nacure ® XP-221, aromatic sulphonic acid, supplied by King Industries, Norwalk, Connecticut.
[6]Cymel ® 1168, monomeric melamine formaldehyde resin fully alkylated (50% methyl; 50% isobutyl) supplied by Cytec Industries Inc., West Patterson, New Jersey.
[7]9% Solids of Silica dispersion in acrylic resin solution and aromatic hydrocarbon solvent.
[8]Hyperbranched Acrylic from Example 1.
[9]64% of barium sulfate in acrylic resin solution and aromatic hydrocarbon solvent.

The resulting 3 wet primer surfacer composition has a theoretical solid content of 61% and spray solids was 58% by weight.

Example 3 and Comparative Examples 1-2

3 Wet Coating Method Using 3 Wet Primer Prepared Above Compared to a Conventional Baked Primer Applied by a Conventional Method and 3 Wet Method Phosphated steel panels were coated in three different ways: (1) using 3 wet coating method with primer prepared above (example 3); (2) using a 3 Wet coating method but with a standard baking primer (comparative example 1); and (3) using a conventional primer baking process with a standard baking primer (comparative example 2) as a control.

In Example 3, the primer surfacer of Example 2 was applied by spraying primer-surfacer onto 3 separate phosphatized steel panels coated with a cured cathodic epoxy resin based eletrodeposition primer (Cormax®6 ED from DuPont Company, Wilmington, Del.) to get film builds of 12, 29 and 49 micron. The primer surfacer layers and all following layers were applied to the panels using a 55 serrated bell cup. After primer surfacer application, the panels were allowed to air flash dry at room temperature for 3 minutes and this was followed by the application of Pueblo Gold solvent borne basecoat (commercial code 647A01099 from Du Pont Company) in two coats with flash off 3 minutes getting final basecoat film build 18 micron dry and followed by the application of acrylosilane clearcoat (Gen® 4 ES from DuPont Company, Wilmington, Del.) flashed dried for 10 minutes and baked for 30 minutes 140° C. on vertical and horizontal position for this study.

The 3 wet primer surfacer composition of this invention was applied as above in comparison with a commercial Titanium Frost 2 in 1 baking primer 708-DN079 from DuPont Company applied using the same 3 wet process described above (Comparative Example 1) and also applied using a conventional process baking the primer between basecoat application (Comparative Example 2) and the coated panels were then compared. The results are reported in FIGS. 3-6 and in the Table below.

Figure 4:
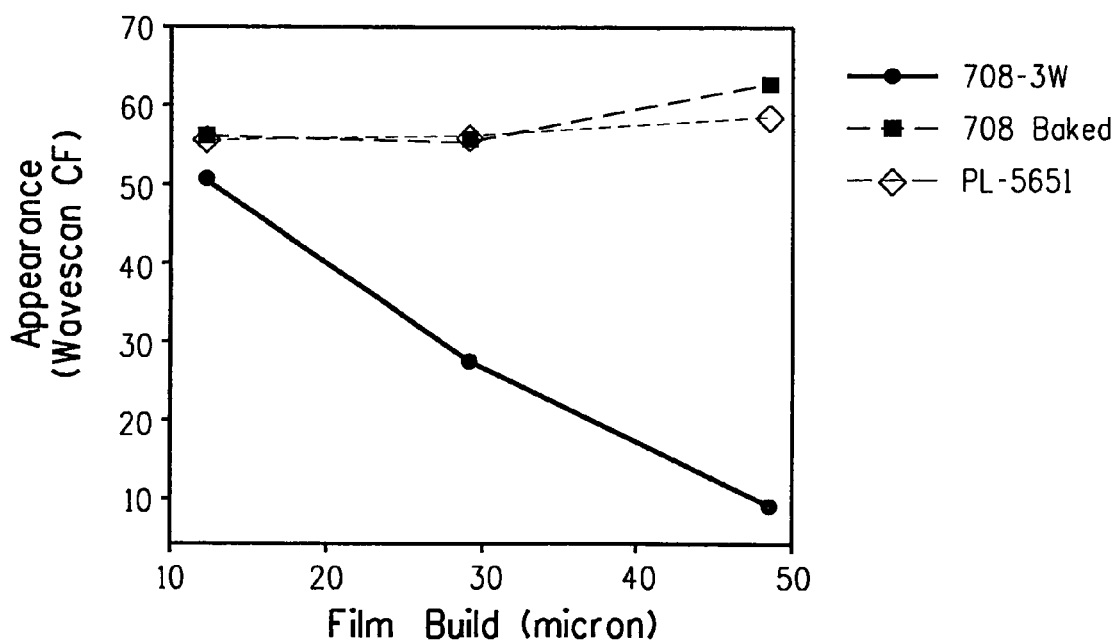
FIG. 4 is a graph showing the appearance of a vertically baked panel coated by the process of this invention.

FIGS. 3 and 4 show that the 3 Wet Primer (from Example 2) produces an automotive quality appearance similar to conventional baked primers made applied using the standard primer bake technique (Comparative Example 2). The figures also show that standard baked primers are incapable of running on a 3 Wet coating line (Comparative Example 1) at automotive quality. The determination of whether the appearance was of automotive quality, i.e., whether the coating had an aesthetic appearance that meets the standard of automotive finishes, was determined by measurements taken from a WaveScan DOI instrument from BYK Gardner. This instrument measures the visual appearance of a finish by looking at longer waves that are indicative of a condition commonly known as orange peel and looking as well at shorter waves which helps to quantify the so-called "distinctness of image" or DOI. These parameters taken in combination (by WaveScan CF readings) can be used to quantify the overall visual appearance of a vehicle finish. A minimum of horizontal 60 and vertical 50 is desirable for automotive use.

Figure 5:
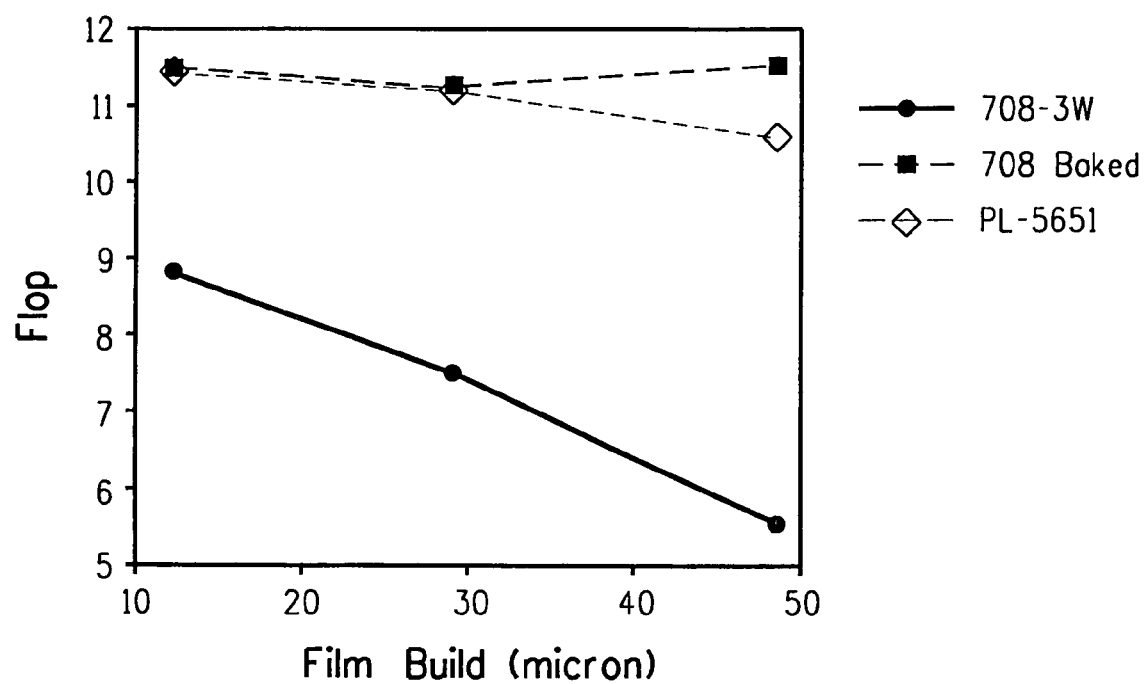
FIG. 5 is a graph showing flop (metallic effect) of a horizontally baked panel coated by the process of the invention.

FIG. 5 shows the metallic effect or flop of the finishes tested. The flop values were calculated from measurements determined by the X-Rite® machine from X-Rite Inc., which measures the brightness property of each panel from 15°, 45°, and 110® angles. An average of three readings is taken at each angle and the following formula is used to calculate the flop:

$$\text{Flop}=((L15°-L110°)*10/L45°).$$

Chip resistance and adhesion for the multilayer coatings produced above were also tested. The following test procedures were used.

Adhesion—the adhesion of 0 to 5 was determined in accordance with test method ASTM D3359—a rating of at least 4B is an acceptable minimum.

Chip Resistance—which measures the ability of a coating system to resist physical damage from impact of a hard material most commonly stones or gravel which are thrown against the vehicle by the wheels of passing cars, or in the case of rocker panels thrown up against the car by the wheels of the same car—was determined utilizing a gravelometer and follows the procedure described in test method SAE J-400—a rating of at least 5 is an acceptable minimum.

The test results are summarized in the Table below.

TABLE 1

Physical Properties of Panels Using DuPont 708 Line Primer Conventional Process versus 3 Wet Primer and 3 Wet Process

| | Primer | Process | Adhesion | Chip (SAE J400) |
|---|---|---|---|---|
| Comparative Example 2 | 708DN079 | Conventional | 5 (No failure) | 5A |
| Example 3 | 3 Wet Primer of Example 2 | 3 Wet | 5 (No failure) | 5A |

Figure 6A:
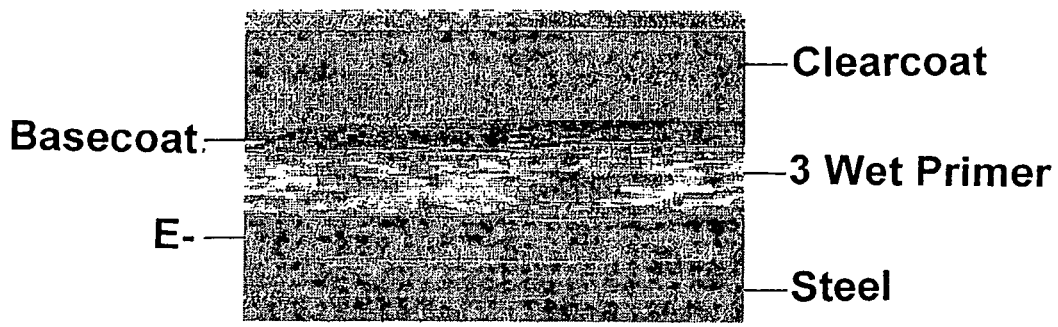
FIGS. 6A, 6B and 6C are micrographs at 100× magnification showing cross-sectional views of panels coated by the process of this invention, in comparison to a conventional primer baking process and also in comparison to a three wet process similar to that of the invention but using a commercial baking primer.
Figure 6B:
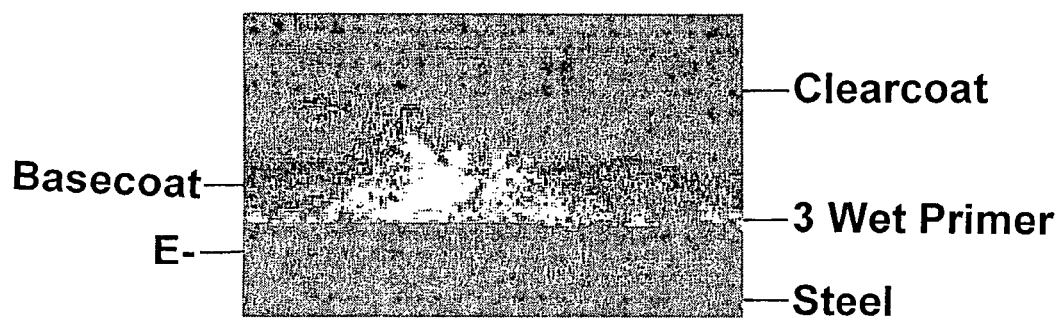
Figure 6C:
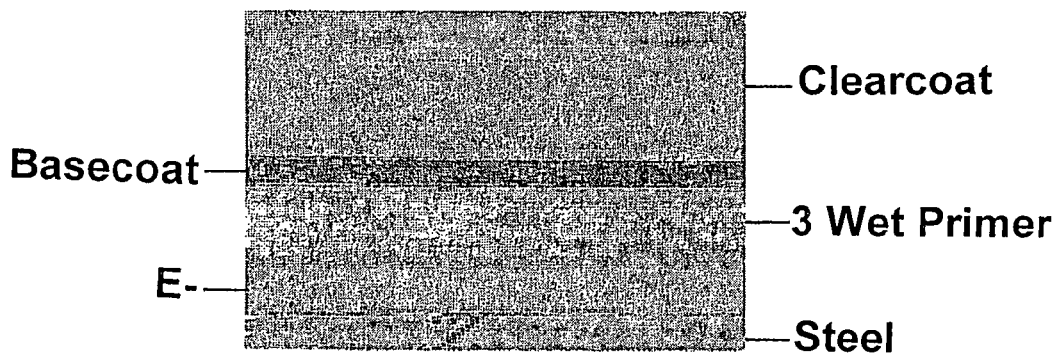

FIGS. 6A, 6B, and 6C are pictures of cross-sectional views of coated panels prepared in Examples 3 and Comparative Examples 1 and 2, respectively, and show the levels of intermixing between the primer and process. Clearly, the conventional baked primer cannot be run using a 3 wet process application process (Comparative Example 1; FIG. 6B), while the primer of this invention (Example 2) when applied using a 3 wet process (Example 3; FIG. 6A) produced results similar to that of a conventional baked primer applied using a conventional primer baking process (Comparative Example 2; FIG. 6C).

In summary, the results indicated that an automotive quality appearance can be obtained using the primer coating composition of this invention in a three-coat-one-bake (i.e., 3 wet) process.

Various other modifications, alterations, additions or substitutions of the components of the processes and compositions of this invention will be apparent to those skilled in the art without departing from the spirit and scope of this invention. This invention is not limited by the illustrative embodiments set forth herein, but rather is defined by the following claims.

What is claimed is:

1. A method for forming a multi-layer coating comprising sequentially applying a layer of a primer coating composition, a layer of a base coating composition and a layer of a clear coating composition on a substrate; and simultaneously curing the applied three layers by baking, wherein the primer coating composition comprises: a film forming binder and an organic liquid carrier, and optionally pigment(s) in a pigment to binder weight ratio of about 1:100-150:100; and the binder contains about:

(a) 40 to 95% by weight, based on the weight of the binder, of a caprolactone modified branched acrylic polymer having a hydroxyl and/or carboxyl monomer content, all or part of which has been reacted with a cyclic lactone, of about 1 to 65% by weight and a weight average molecular weight of about 10,000 to 150,000; and (b) 5 to 60% by weight, based on the weight of the binder, of a crosslinking agent selected from the group consisting of an aminoplast resin, a blocked polyisocyanate resin, or a mixture thereof.

2. The method according to claim 1, wherein the primer composition is totally free or essentially free of particles of crosslinked nonaqueous dispersion resins and/or crosslinked microgel resins.

3. The method according to claim 1, wherein the method is performed on a pre-primed substrate on which an electrodeposition coated film has been formed.

4. The method according to claim 1 wherein the substrate is a vehicle body or part thereof.

* * * * *